(12) United States Patent
Wang et al.

(10) Patent No.: US 7,020,766 B1
(45) Date of Patent: Mar. 28, 2006

(54) PROCESSING ESSENTIAL AND NON-ESSENTIAL CODE SEPARATELY

(75) Inventors: Hong Wang, Fremont, CA (US); Ralph Kling, Sunnyvale, CA (US); Yong-Fong Lee, San Jose, CA (US); David A. Berson, Marietta, GA (US); Michael A. Kozuch, Beaverton, OR (US); Konrad Lai, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 659 days.

(21) Appl. No.: 09/580,755

(22) Filed: May 30, 2000

(51) Int. Cl.
*G06F 9/30* (2006.01)

(52) U.S. Cl. ............... 712/227; 712/207; 712/229; 712/244; 712/1; 717/126; 717/128; 717/131

(58) Field of Classification Search ........... 712/1, 712/32, 42, 43, 205–207, 227–229, 244, 712/126–128, 131
See application file for complete search history.

(56) References Cited

U.S. PATENT DOCUMENTS

| | | | |
|---|---|---|---|
| 5,794,068 A * | 8/1998 | Asghar et al. | 712/35 |
| 5,881,135 A * | 3/1999 | Watts et al. | 379/88.02 |
| 6,205,544 B1 * | 3/2001 | Mills et al. | 712/230 |
| 6,401,192 B1 * | 6/2002 | Schroter et al. | 712/207 |
| 6,745,222 B1 * | 6/2004 | Jones et al. | 718/107 |

OTHER PUBLICATIONS

Noonburg, D.B., et al., "Framework for Statistical Modeling of Superscalar Processor Performance", *Proceedings of the Third International Symposium on High-Performance Computer Architecture*, pp. 298-309, (1997).

Noonburg, D.B., et al., "Theoretical Modeling of Superscalar Processor Performance", *Proceedings of the 27th Annual International Symposium on Microarchitecture*, pp. 52-62, (1994).

* cited by examiner

*Primary Examiner*—William M. Treat
*Assistant Examiner*—Tonia L. Meonske
(74) *Attorney, Agent, or Firm*—Schwegman, Lundberg, Woessner & Kluth, P.A.

(57) ABSTRACT

A conjugate processor includes an instruction set architecture (ISA) visible portion having a main pipeline, and an h-flow portion having an h-flow pipeline. The binary executed on the conjugate processor includes an essential portion that is executed on the main pipeline and a non-essential portion that is executed on the h-flow pipeline. The non-essential portion includes hint calculus that is used to provide hints to the main pipeline. The conjugate processor also includes a conjugate mapping table that maps triggers to h-flow targets. Triggers can be instruction attributes, data attributes, state attributes or event attributes. When a trigger is satisfied, the h-flow code specified by the target is executed in the h-flow pipeline.

37 Claims, 4 Drawing Sheets

PROCESSING ESSENTIAL AND NON-ESSENTIAL CODE SEPARATELY

FIELD

The present invention relates generally to microprocessors, and more specifically to microprocessors that support dynamic optimization of software.

BACKGROUND OF THE INVENTION

Modern microprocessors and software compilers employ many techniques to help increase the speed with which software executes. Examples of techniques that are used to help speed up the execution speed of processors include speculative execution of code, reuse buffers that hold instances of previously executed software for later reuse, and branch target buffers (BTB) that try to predict whether branches are taken.

Research is ongoing in areas of modeling processor performance. See Derek B. Noonburg & John P. Shen, "Theoretical Modeling of Superscalar Processor performance," MICRO-27, November 1994; and Derek B. Noonburg & John P. Shen, "A Framework for Statistical Modeling of Superscalar Processor Performance," Proceedings of the Third International Symposium on High Performance Computer Architecture, February 1997.

Some modern processors employ dynamic optimization that attempt to more fully utilize the resources of the processor. Approaches include: control speculation using predicate promotion; load speculation using advanced or speculative advanced load or prefetch load; and static hints for branch direction or cache placement for loads. Many of these approaches can result in "non-essential" code used for optimization being intermixed with "essential" application level software code.

The essential code is typically created by a compiler from the application level software code. The essential code is what determines the logical correctness of the resulting program. The non-essential code is also typically created by a compiler, but it differs from the essential code in that it is a result of optimizations and other compile-time operations, rather than the applications level software program.

Intermixing of non-essential code and essential code creates competition for processor resources between the two types of code. Although a net increase in execution speed can result from the above techniques, if the competition for resources is fierce, the above techniques can slow down the execution of the application level software.

In addition to static intermixing of non-essential code with essential code, some known dynamic optimization techniques reorder machine instructions in an attempt to more fully utilize processor resources. For example, dynamic optimizers can introduce non-essential prefetch instructions and intermix them with original essential code, and/or reorder the original essential code based on run-time dynamic profiling feedback. This can lead to problems, in part because reordering of machine instructions may draw out latent "bugs" in the software, thereby sacrificing the logical correctness of the application level software code. One example of a latent bug is an uninitialized variable. The bug may not be detected in the original code because of a fortuitous register assignment, but when instructions are reordered, the bug may manifest itself.

For the reasons stated above, and for other reasons stated below which will become apparent to those skilled in the art upon reading and understanding the present specification, there is a need in the art for an alternate method and apparatus for combining essential code and non-essential code.

DESCRIPTION OF EMBODIMENTS

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention provide a mechanism for executing essential code and non-essential code in separate pipelines. A first pipeline executes the essential code which determines the logical correctness of the application level software. A second pipeline executes the non-essential code. A conjugate mapping table maps triggers that include instruction attributes, data attributes, event attributes, and state attributes to portions of the non-essential code. When a trigger is "satisfied," the non-essential code mapped thereto is executed in the second pipeline. In some embodiments, the non-essential code provides hints to increase efficiency of the operation of the first pipeline. In other embodiments, the non-essential code virtualizes instructions or groups of instructions in the essential code.

In this description essential and non-essential code are defined with respect to a particular reference architecture. Essential code is that code which is both necessary and sufficient for correct execution of a program on the reference architecture. Non-essential code is code which is not necessary for correct execution, but which may benefit the performance of the essential code on the reference architecture. In a pure implementation of the reference architecture, all essential code is executed on a visible main pipeline, while all non-essential code is executed on a second internal pipeline, which may be optionally omitted with no impact on correctness of the executed program. In some embodiments that deviate from the reference architecture, the visible main pipeline does not execute all of the essential code. In these embodiments, some essential code is executed on a second internal pipeline along with any non-essential code.

A typical example occurs when a first reference architecture is implemented as described, including the optional internal pipeline. A subsequent reference architecture is then defined with functionality which is a proper superset of the first reference architecture. Using the optional internal pipeline, through mechanisms to be described, the original implemented architecture is then able to support the enhanced functionality of the subsequent reference architecture. The portion of essential code that uses the added functionality of the second reference architecture cannot be executed on the visible main pipeline of the implemented architecture, and so is executed with any nonessential code on the internal pipeline instead.

Figure 1:
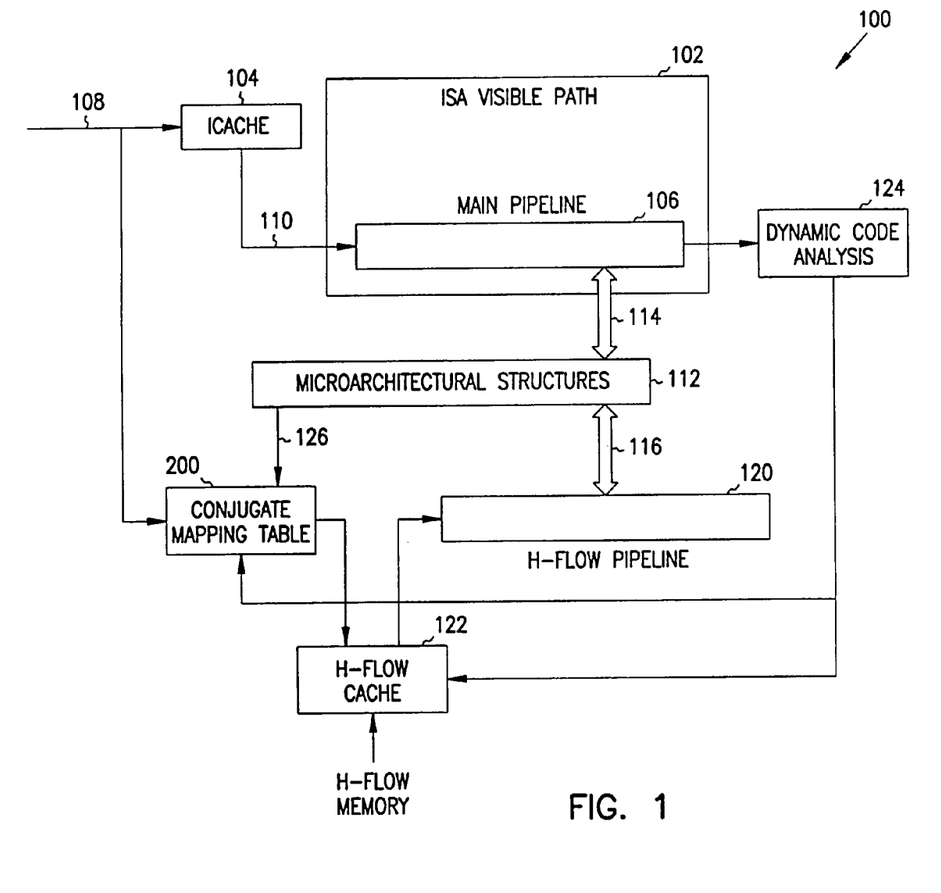
FIG. 1 shows a conjugate processor.

FIG. 1 shows a conjugate processor according to an embodiment of the present invention. Conjugate processor 100 includes instruction set architecture (ISA) visible path 102, microarchitectural structures 112, conjugate mapping table 200, h-flow cache 122, h-flow pipeline 120, and dynamic code analysis block 124. "H-flow" is a term that describes a "hint calculus" instruction flow that is separate from the main instruction flow in main pipeline 106 within ISA visible path 102. "Hint calculus" is a term that describes the action of h-flow pipeline 120 as it generates "hints" and communicates them to microarchitectural states 112. Hint calculus is, by definition, non-essential code. In other words, hint calculus does not affect the logical correctness of the application level software.

ISA visible path 102 includes main pipeline 106 and structures associated therewith. Structures within ISA visible path 102 are visible to the applications level programmer, hence the term "ISA visible." Icache 104 receives instructions on node 108, and provides instructions to main pipeline 106 on node 110. Main pipeline 106 includes pipeline stages such as decoding, executing, and committing. In general ISA visible path 102, and main pipeline 106 in particular, execute essential code.

Icache 104 and h-flow cache 122 are logically separate cache memories. Each holds instructions from different instruction streams. Icache 104 holds essential instructions and h-flow cache 122 holds non-essential instructions. In some embodiments, the physical design of the cache combines Icache 104 and h-flow cache 122. In these embodiments, an instruction fetched into h-flow cache 122 is available in Icache 104 to be fetched by main pipeline 106. In some embodiments, this feature is exploited for instruction prefetch purposes by using h-flow pipeline 120 to prefetch essential instructions that are expected to be executed by main pipeline 106.

Main pipeline 106 communicates with microarchitectural structures 112. Microarchitectural structures 112 include structures that store the microarchitectural states of the processor. Examples include register banks, branch target buffers (BTBs), data cache, and reuse buffers. Main pipeline 106 can retrieve state information from microarchitectural structures 112, and can also modify state information held in microarchitectural structures 112.

The terms "architectural structures" and "architectural states" are used herein to describe the processor at a level that is visible to a programmer. For example, structures included within ISA visible path such as an architectural register file in main pipeline 106 are architectural structures. In contrast, the terms "microarchitectural structures" and "microarchitectural states" are used herein to refer to low level logical structures within the processor that are not necessarily visible to a programmer. For example, conjugate processor 100 includes microarchitectural structures 112 that are not within ISA visible path 102, but that can influence architectural states of main pipeline 106 using communications on node 114. In some embodiments, the architecture is implemented using the microarchitecture, and the architectural states are a subset of the microarchitectural states.

Conjugate mapping table 200 receives instructions on node 108 and state information on node 126. The state information on node 126 can be microarchitectural or architectural state information. In some embodiments, conjugate mapping table 200 includes triggers and targets. When triggers are satisfied, then the target is communicated to h-flow cache 122, which in turn provides instructions from h-flow memory or cache structures that include h-flow code (not shown) to h-flow pipeline 120. Conjugate mapping table 200 is explained more fully with reference to FIG. 2 below. H-flow cache 122 can include actual h-flow code sequences, sometimes referred to as "handlers," or can include pointers to the handlers. H-flow cache 122 can also include pointers to data that is used by h-flow code.

In the reference architecture, h-flow is a conjugate flow that represents the logical conjugate of the normal instruction flow of the processor. The normal flow of the processor executes instructions that provide the logical correctness of the program. For example, instructions compiled from a user's program are executed in main pipeline 106, and this execution modifies the architectural state of processor 100 in the manner intended by the user. This is the essential code, or the code that ensures the architectural state is modified in the manner intended by the user. The code is called "essential" because it is what determines the final architectural state of the processor.

H-flow code, in contrast, is "non-essential" code. It is referred to as non-essential because in some embodiments, it does not directly affect architectural states of processor 100, even though it may affect microarchitectural states of the processor. H-flow encodes or computes hints that can potentially lead to improved efficiency in computation of the essential code in main pipeline 106.

As shown in FIG. 1, h-flow pipeline 120 communicates with microarchitectural structures 112 on node 116. H-flow pipeline 120 can retrieve architectural or microarchitectural states on node 116, and can also modify microarchitectural states held in microarchitectural structures 112. In some embodiments, h-flow code executed in h-flow pipeline 120 can also directly affect architectural states of conjugate processor 100.

Instructions defined for execution by h-flow pipeline 120 include instructions to handle state transfer and resource mapping between states of main pipeline 106 and states of h-flow pipeline 120. Examples include instructions to download states from the main pipeline's registers to the h-flow pipeline's registers, and instructions to upload states from the h-flow pipeline's register to the main pipeline's registers.

Conjugate flow processor 100 provides a general schema to express a flexible association of diverse hints with the essential portion of the code at various granularities of instructions. This is provided through conjugate mapping table 200, which is described more fully with reference to FIG. 2 below. Because the non-essential portion of the code is not intermixed with the essential portion, conjugate processor 100 can support dynamic computation of hint calculus for any aspect of the microarchitectural optimization without impacting the organization of the essential code.

Dynamic code analysis block 124 analyzes the execution of code in main pipeline 106 and generates h-flow code. The generated h-flow code, when executed, provides hints to ISA visible path 102 in an attempt to improve execution behavior. For example, if a branch is usually taken under certain conditions, dynamic code analysis block 124 can generate h-flow code to support speculative execution of the taken branch under the conditions discovered.

In some embodiments, dynamic code analysis generates h-flow code and replaces default h-flow code that was created at compile time. For example, in the case of a web browser capable of accepting "plug-ins," optimum h-flow code for a plug-in cannot be generated at compile time for the web browser. When a plug-in is installed in the web browser, the dynamic code analysis can adaptively modify the h-flow code utilized with the plug in. The h-flow code can be saved in a ".hint" section so that the next time the plug-in is executed, the h-flow code that is loaded is the h-flow code generated for the plug-in. The hint section is a section of an executable file, much like a .text, .bss, or .data section, and can be saved with the .hint section for the web browser, or can be saved separately and dynamically linked when the web browser uses the plug-in. These mechanisms are explained more fully with reference to FIG. 3 below.

In some embodiments, dynamic code analysis block 124 creates directed acyclic graph (DAG) trace representations of code executed in main pipeline 106. The use of DAG traces in creating h-flow code is analogous to the ordering logic in an instruction scheduler. The instruction scheduler produces a DAG trace that identifies branch instructions that are either mostly taken or not taken. Dynamic code analysis block 124 captures the instruction DAG trace so that the next time the instruction is encountered, the previously generated DAG trace can be used. This can be beneficial when compared to instruction schedulers that regenerate the DAG trace every time a branch instruction is encountered. In traditional trace cache implementations, a trace represents a sequence of instructions executed in a particular program order, and does not include information describing inter-instruction data dependencies. In contrast, a DAG trace in a DAG trace cache of the present invention represents a sequence of instructions that are data dependent in program order.

Dynamic analysis block 124 is also useful to alleviate problems associated with cache misses for load instructions. For a load instruction on the critical path of a program (meaning many future operations are data dependent on the load instruction) that frequently incurs cache misses, a DAG trace can be created that speculatively computes the memory access address for this load instruction. By running this DAG trace ahead of the flow in the main pipeline, the h-flow early run-ahead computation becomes essentially an "early probe for cache access prefetch." Long before the instruction that uses a load is executed, the load is initiated. The h-flow code includes instructions to determine the load address, and the load can be performed as a prefetch by the h-flow pipeline. The data is loaded into data cache, and then the main pipeline can later access the data without causing a cache miss.

It is not necessary for conjugate processor 100 to include dynamic code analysis block 124. Although dynamic code analysis block 124 provides a flexible mechanism for adaptively generating h-flow code, it is not the only mechanism to generate h-flow code. H-flow code can be statically generated, or can be dynamically linked from other sources. This is explained more fully with reference to FIG. 3 below.

Because conjugate processor 100 allows parallelism between the computation of the essential code and the computation of non-essential hint calculus code, little resource competition exists between the two flows.

H-flow code has many uses. Examples include sandbox checking, security checking, and instruction set virtualization at varying levels of abstraction. The remainder of this description discusses embodiments of conjugate processors and related mechanisms. Any of the embodiments described can be utilized for any purpose to which an h-flow code sequence can be put. For example, the discussion below with reference to FIG. 2 describes various embodiments of triggers that can be used to trigger h-flow code sequences. Any of these triggers can be used to trigger h-flow code for any purpose. Also for example, if a particular embodiment is described with reference to h-flow code that adds security, it may also be the case that an h-flow code sequence supporting aggressive speculation can be substituted therefor without departing from the scope of the present invention.

Figure 2:
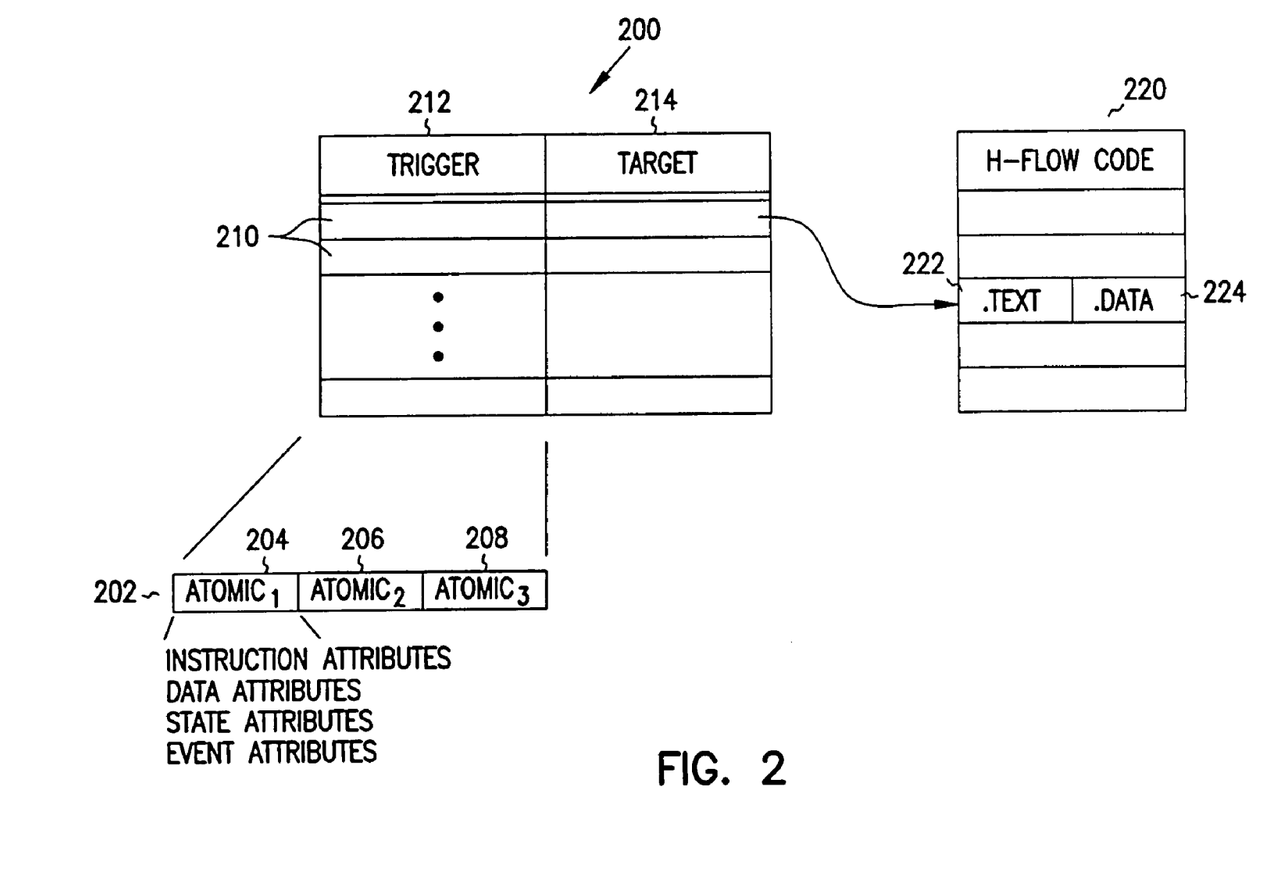
FIG. 2 shows a conjugate mapping table.

FIG. 2 shows a conjugate mapping table. Conjugate mapping table 200 is a hardware table that implements conjugate mapping between triggers 212 and targets 214. Conjugate mapping table 200 includes records 210, or "entries," that each map a trigger to a target. Triggers are conditions that can be satisfied, and targets are references to h-flow code sequences 220. When a trigger in a record is satisfied, h-flow code specified by the target is triggered. As a result, the h-flow code is executed in the h-flow pipeline.

Triggers included within conjugate mapping table 200 can include any information useful to trigger the execution of an h-flow code sequence. Examples include instruction triggers, data triggers, state triggers, and event triggers. Instruction triggers can trigger an h-flow code sequence based on an instruction attributes such as address, opcode, operand, and the like. Data triggers can include data attributes such as data operand values, data locations (including memory locations and register IDs), and the like. State triggers include architectural and microarchitectural state information such as the state of microarchitectural structures that influence speculative execution, code reuse, and the like. Event triggers can include any event that occurs when software is executing. Examples of events include processor interrupts and exceptions.

Trigger 202 is shown as an exploded view of one of triggers 212 in conjugate mapping table 200. Trigger 202 is a "vector" trigger made up multiple "atomic" attributes 204, 206, and 208. In general, triggers 212 can include single atomic attributes, or can include vector triggers. When a trigger is specified as a vector, as in the example of trigger 202, the trigger is satisfied when a boolean function of the atomic values is satisfied. For example, in an embodiment where atomic value 204 includes an instruction location, atomic value 206 includes an instruction opcode, and atomic value 208 includes an instruction operand, and the boolean function is "and," trigger 202 is satisfied when the specified opcode and operand are fetched from the specified location. Atomic triggers can be negated, and by listing several vector triggers with the same target, a nearly arbitrary sum-of-product expression can be generated. For example, two vector triggers with the same target can be used to generate the logical function: "trigger h-flow A execution if (1) the instruction pointer is X and register R is not zero, or (2) the instruction pointer is Y and the translation look-ahead buffer (TLB) is full. In some embodiments, Nth occurrence triggers are implemented. For example, an Nth occurrence trigger can implement the logical function: "trigger h-flow A execution if N BTB misses are observed."

In some embodiments, targets within conjugate mapping table 200 represent code and data. In other embodiments, targets within conjugate mapping table point only to h-code sequences. The h-code sequences can have code sections and data sections such as ".text" section 222 and ".data" section 224 that are generated by a compiler. Within the data section, an h-flow sequence can save state information. For example, an h-flow sequence may be used to gather runtime profile information later used to gather reuse instances for reusable blocks of essential code. This profile information can be saved in the data section.

Instruction Triggers

Instruction triggers can specify conditions based on one or more instruction attributes. These attributes include instruction locations (sometimes referred to as "instruction pointer values"), instruction opcodes, instruction operands, or the like. When one of these attributes is used alone, it is an atomic trigger. An atomic trigger is satisfied when the condition specified by the single attribute is satisfied. For example, if an atomic trigger specifies an instruction pointer value, the trigger is satisfied when the instruction pointer value is encountered in the program, and the h-flow code specified in the target of the corresponding record is triggered as a result.

When an instruction opcode is mapped as an atomic trigger to an h-flow code sequence, the trigger is satisfied and the h-flow code sequence is executed when the opcode is encountered in the instruction stream. Likewise, when an instruction operand is mapped as an atomic trigger to an h-flow code sequence, the trigger is satisfied when the operand is encountered in the instruction stream.

Instruction attributes can be utilized separately as atomic triggers, or they can be used in combination as vector triggers. For example, when an opcode and operand are utilized together to create a vector trigger, the trigger is satisfied when an instruction is encountered having both the opcode and the operand. This allows more discrimination in the triggering of h-flow code sequences.

Example uses for triggers based on instruction attributes include speculative execution and computation reuse. For example, if a frequently encountered block of essential code can be reused, meaning for the same set of input values (livein states), the code block produces the same set of output values (liveout states), the instruction pointer marking the entrance to the reused block becomes a trigger entered in conjugate mapping table 200 and an h-flow code sequence implements the detection and verification of the reusability function in the h-flow pipeline to check whether there is a match of livein states. Likewise, if a particular branch within a program is often taken, an instruction pointer value that precedes the branch can be used as a trigger to cause speculative execution of the code in the taken branch. The results of speculative execution in the h-flow pipeline can be used in multiple ways. For example, the states of the h-flow pipeline that result from speculative execution can be copied to the main pipeline, or the actions of the h-flow pipeline can cause the instructions in the taken path to be fetched into instruction cache so that when the main pipeline takes the branch, the instructions are in instruction cache memory and can be fetched with low latency.

An example use of an instruction operand in a trigger includes the re-mapping of virtual register sets. In some embodiments, a memory address or register ID can be specified as a trigger. When the location or register is accessed, the trigger is satisfied, and the corresponding h-flow code sequence is executed in the h-flow pipeline. If, in one generation of microprocessors, 128 registers exist, and in a later generation 256 exist, software compiled for the later generation may reference a register number higher than 128. When this code executes on the earlier generation processor, conjugate mapping table 200 can have triggers that include a register address greater than 128. The trigger can cause h-flow code to perform a virtual mapping of registers such that software can run that attempts to access a greater number of registers than physically exist in a processor. In this manner, a bank of registers can be renamed or re-mapped using h-flow code sequences.

Like the alternative register mapping described above, when a memory location is used as an instruction operand atomic trigger in conjugate mapping table 200, alternative mappings for memory can be utilized. For example, a translation look ahead buffer (TLB) can be accessed with h-flow code. In this manner, an operating system can construct its own paging mechanism to manage a TLB manipulated by h-flow code. This effectively allows an operating system to virtualize existing hardware normally built into the processor.

Another example use of instruction attributes as triggers involves error checking. For example, an h-flow code sequence that performs an error checking routine can be triggered using an instruction operand as an atomic trigger. In this manner, certain registers, memory locations, or groups thereof, can be selectively subjected to error detection using h-flow.

Instruction attributes as atomic triggers allow interception of code in the main pipeline at the instruction level. The contents of the atomic trigger specify an attribute of an instruction that is used for interception purposes. For example, when the atomic trigger is an instruction pointer, the instruction at that address triggers an h-flow sequence. Likewise, when the atomic trigger is an opcode, instructions represented by the opcode trigger an h-flow sequence. In the preceding paragraphs, atomic triggers have been described with reference to a few examples; however, any type of instruction attribute can be utilized as an atomic trigger without departing from the scope of the present invention.

Data Triggers

Data triggers can specify conditions based on one or more data attributes. These attributes include data operand values, data locations (including memory locations and register IDs), and the like. When one of these attributes is used alone, it is an atomic trigger. For example, if a trigger specifies a data operand value, the trigger is satisfied when the data operand value is encountered in the program, and the h-flow code specified in the target of the corresponding record is triggered as a result. Vector combinations of data attributes can also be used as triggers. For example, in an embodiment where a vector combination of data location and data operand value is used as a trigger, the trigger is satisfied when the data operand value and the data location are satisfied at once. This can occur when a "load" instruction loads the data operand value from the data location.

Typically, data operand values are available later in the pipeline process than instruction related values described above. For example, data operand values are usually available during execution, whereas instruction related information is usually available shortly after fetching.

One example use of a data operand as an atomic trigger is the register address of a register dedicated as the stack pointer. It may be beneficial to perform more checking when the data operand represents a stack pointer, than when the data operand represents any other register. When a stack pointer register is used as a data operand, an h-flow code sequence that checks the validity of the stack pointer can be triggered. This can add any level of checking using h-flow code. This is logically equivalent to built-in-self-test (BIST), but unlike traditional BIST that is hardwired during chip fabrication, h-flow enabled BIST allows more flexibility. H-flow enabled BIST provides the ability to circumvent known bad circuitry by emulating missing functionality or rerouting access around damaged resources. This is an example of microarchitectural level resource virtualization.

If the value in the stack pointer register is within a range expected to be a valid stack in a user program, more extensive checking may be employed. When the stack pointer represents the operating system kernel stack pointer, the context has switched from a user program to the kernel, and less checking may be needed. In general, any type of h-flow code sequence can be applied.

As previously described, any vector combination of atomic values can be utilized as a trigger in conjugate mapping table 200. Vector triggers can include instruction attributes, data attributes, or any other attributes in any combination. For example, when an instruction operand and a data operand value are combined as a vector trigger, an h-flow code sequence can be triggered when a particular data operand value is associated with a particular instruction operand. This allows an h-flow code sequence to be associated with particular runtime contexts, such as when the instruction operand is a stack pointer register, and the data operand value is a stack pointer value associated with a particular context.

H-flow code sequences can also be utilized to fetch into cache those instructions that are expected to be used by the main pipeline. When h-flow code pre fetches instructions into cache, the fetching operation of the main pipeline can be much quicker. For example, when a user program calls a function in a dynamic link library (DLL), such as the "putc" function which prints a character in the "C" language, instructions associated with the function being called are resident in the DLL. An atomic or vector trigger can be built that represents an instruction prior to the DLL call, and can be used as a trigger for an h-flow code sequence that begins to fetch the instructions so that they are within cache when needed by the main pipeline.

A data location trigger can be utilized to trigger h-flow code sequences based on the location of a data value. For example, if a data value is resident within a protected area of memory, an h-flow code sequence can be triggered that verifies access privileges of the user executing the code in the main pipeline. This enables access sandboxing.

An h-flow code sequence can also be used for error detection and correction in specific areas of on-chip memory. For example, if one or more cache locations is known to be unreliable or defective, an atomic trigger or a vector trigger can be built that represents an access to the unreliable cache location and an h-flow code sequence that performs error detection and correction can be employed. In these embodiments, the effective yield of the integrated circuit can be increased because the faulty cache locations can be made to function correctly. Effectively, the conjugate flow hardware and h-flow code become error-tolerating parity resources for the main pipeline.

State Trigger

State triggers can specify conditions based on one or more state attributes. These attributes include architectural and microarchitectural states. Examples include state information held in reuse buffers, branch target tables, and other microarchitectural structures that support speculation. State attributes can be combined with instruction attributes and data attributes to create hybrid vector triggers. When the hybrid vector trigger is satisfied, the corresponding h-flow code is triggered.

Event Trigger

Triggers within conjugate mapping table 200 can also include event attributes. Examples of events are interrupts, exceptions, and the like. In some embodiments, events are fully specified using vector combinations of atomic instruction triggers and atomic data triggers. In this manner, h-flow code sequences can be utilized in place of interrupt routines and exception handlers, or can be utilized as epilogs and pro logs of interrupt routines and exception handlers. Another example of an event usable as a trigger in conjugate mapping table 200 is a processor state register. In some embodiments, processor state registers include bits or values that represent interrupts and exceptions. When these bits or values are changed, interrupts or exceptions occur. When one of these interrupts or exceptions is to be used as an event trigger, the processor state register can be used as an event trigger.

Triggers can also be specified by otherwise unused portions of instruction opcodes or instructions words. For example, in a processor having a 64 bit instruction field with six unused bits, the six unused bits can be utilized as an conjugate mapping trigger. These otherwise unused bits can be used alone as an atomic trigger or can be used in combination with other atomic values to generate a vector trigger.

Instruction Set Virtualization

"Instruction set virtualization" refers to an example use of conjugate processor 100 (FIG. 1). This discussion of virtualization is set apart from other discussions of sample uses in part because code that executes on h-flow pipeline 120 in an embodiment supporting virtualization can be thought of as not strictly non-essential. In some embodiments, the implemented architecture is a subset of the reference architecture, and virtualization can support the emulation of the reference architecture on the implemented architecture.

In general, example uses of h-flow described thus far are hint calculus uses. When used for hint calculus, h-flow code includes purely non-essential code that only provides hints to affect execution of essential code on the main pipeline. If h-flow is purely non-essential, then even if the h-flow is wrong, the essential code will still provide the correct result. For example, if non-essential h-flow code is designed to prefetch instructions on a predicted path, but the prediction is wrong, the h-flow will be wrong, but the correct essential instructions will eventually execute on the main pipeline, and the correct logical result will be obtained.

In some embodiments, the architecture of conjugate processor 100 (FIG. 1) is used to execute code on h-flow pipeline that is not strictly non-essential, but is nonetheless still invisible to the programmer. One such example use is virtualization of portions of a user program. Virtualization can be accomplished at varying levels of abstraction. For example, a single machine instruction can be virtualized using an opcode as a trigger. When the opcode is encountered, the trigger is satisfied, and an h-flow code sequence is executed in the h-flow pipeline. The instruction is "virtualized" because the h-flow code sequence is meant to take its place. The results of the h-flow execution can replace the results of the instruction being virtualized.

The method and apparatus of the present invention provide a triggering mechanism and closely coupled hidden microarchitecture pipeline to enable virtualization without affecting the main pipeline computation. In other words, instruction set virtualization is achieved without change to the original code in the main pipeline.

Instruction level virtualization can allow a non-native opcode to be implemented on the processor, or an existing opcode can be mapped to a different function. For example, an opcode that is not defined in the instruction set of the processor can be implemented in h-flow code. The opcode is specified as an atomic trigger, and when the opcode is encountered in the main pipeline, the trigger is satisfied and instead of passing the opcode into the pipeline, the h-flow code sequence executes on the h-flow pipeline. In some embodiments this can be useful when software compiled for a later generation of processors is executed on an earlier generation that does not have the opcode defined. Forward compatibility can be provided for instructions implemented in the later generation of processors. In this manner, older processors can be dynamically upgraded such that they can execute executable files that include processor instructions only defined in a newer generation of processor. This is an example of instruction semantic virtualization that implements forward compatibility.

Forward compatibility can also be implemented using event triggers. For example, if an unrecognized opcode is encountered, an exception will be generated. The exception can be specified in conjugate mapping table as an event trigger, and an h-flow routine that executes the otherwise unknown opcode can be the target.

Instruction virtualization can also occur at a higher level. Conjugate mapping table 200 can re-map not just individual instructions, but also blocks of instructions into h-flow code. A group of instructions or an entire function or subroutine can be replaced with h-flow code when an instruction pointer is used as an atomic trigger in conjugate mapping table 200. For example, an instruction pointer trigger can correspond to the first location in an integer divide routine. If, after the original integer divide routine is implemented, a faster algorithm becomes available in h-flow, the integer divide routine can be effectively replaced with h-flow using an instruction pointer value as a trigger.

In many processors, inter-instruction communication is accomplished using architectural states. That is, one instruction modifies architectural states, and the next instruction begins operation with architectural states left by the last instruction. When h-flow code virtualizes an instruction, architectural states are modified, and the next instruction uses the same inter-instruction mechanism for communications and the result is the same. Data states and control states can be updated. Data states include registers, and control states include next IP, BTB contents, and other microarchitectural states. The main pipeline then continues with the new IP.

Any suitable atomic value or vector can be used to trigger virtualization. For example, an opcode can be an atomic trigger used to virtualize every occurrence of a specific instruction, or an opcode can be combined with a location to virtualize a specific occurrence of an instruction.

Figure 3:
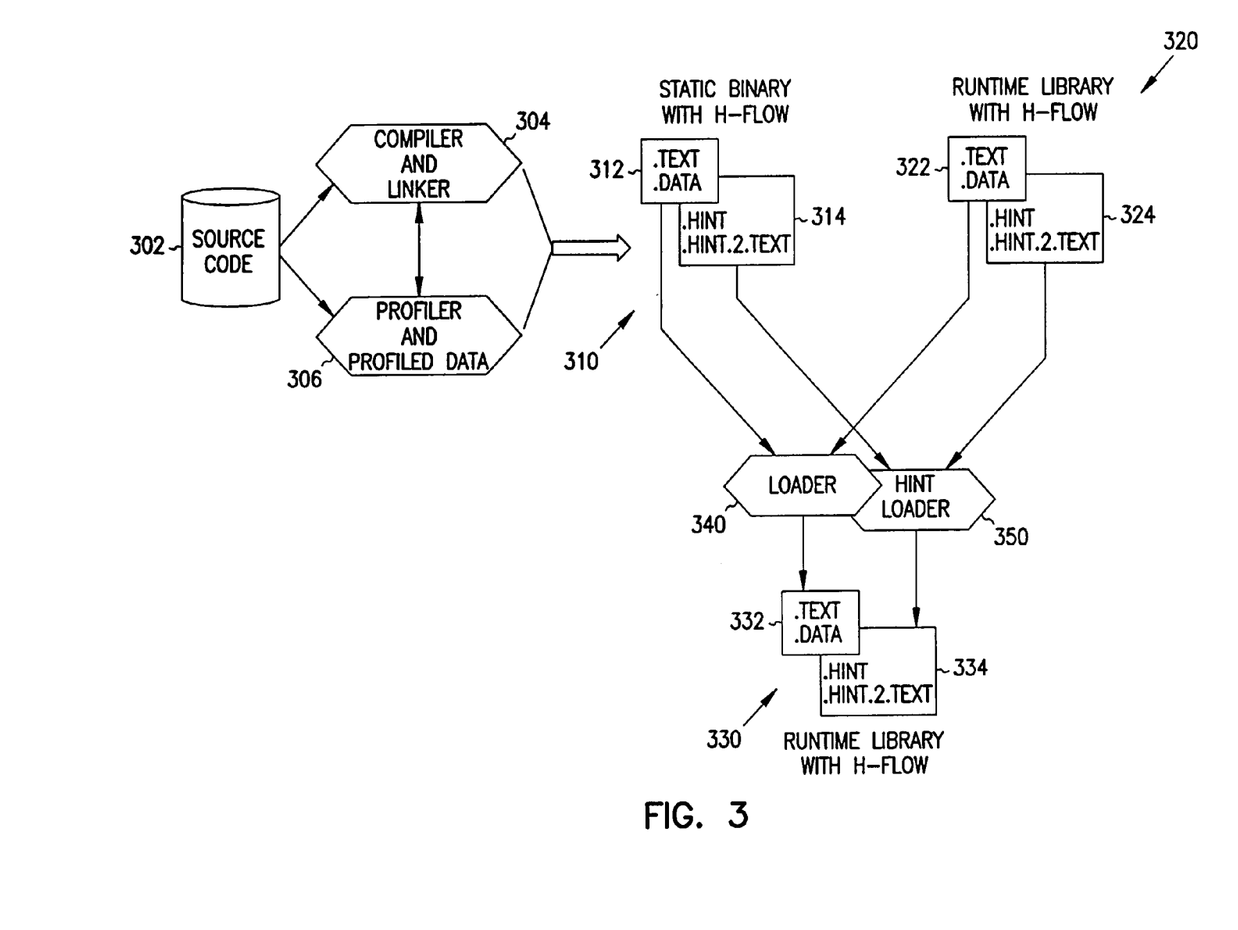
FIG. 3 is a diagram showing the generation of a runtime binary with h-flow.

FIG. 3 is a diagram showing the generation of a runtime binary with h-flow. FIG. 3 shows static binary 310 representing a user program being combined with runtime library 320 at runtime to create runtime binary 330. FIG. 3 is shown with one runtime library and one static binary; however, any number of runtime libraries can be included while still practicing the present invention.

As shown in FIG. 3, static binary 310 with h-flow includes essential portion 312 and non-essential portion 314. Essential portion 312 of static binary 310 is generated from source code 302 by compiler and linker 304. Compiler and linker 304 interoperate with profiler and profiled data 306 to generate non-essential portion 314 of static binary 310. Non-essential portion 314 of static binary 310 includes a hint section and a .hint.2.text section. The hint section includes h-flow code that provides hints for the execution of the .text section in essential portion 312 of static binary 310. The .hint.2.text section includes conjugate mappings that trigger h-flow code sequences within the hint section.

In general, any compiled object, such as static binary 310 or runtime library 320, can be generated having an essential portion and a non-essential portion, but this is not necessary. For example, a static binary may include a non-essential portion, and a runtime library may only include an essential portion. Also, a runtime library may include a non-essential portion and not include an essential portion. In this case, the runtime library does not provide software to be linked with the static binary, but instead includes h-flow code to be linked with the non-essential portion of the static binary.

Non-essential portion 314 of static binary 310 is shown in FIG. 3 as having been generated at compile time. This is in contrast to other methods previously described for generating h-flow. For example, dynamic code analysis block 124 (FIG. 1) generates h-flow code and conjugate mappings adaptively. In some embodiments, statically created non-essential code sections, such as non essential portion 314 of static binary 310, are "default" non-essential portions that are replaced or augmented by adaptively created non-essential portions. For example, at runtime, dynamic code analysis block 124 (FIG. 1) can modify or replace h-flow code and conjugate mappings. The modified (or new) conjugate mappings and h-flow code can be written out as new .hint.2.text and .hint sections respectively. In this manner, statically created non-essential portions of programs can be replaced or dynamically modified over time.

The .hint and .hint.2.text sections are not necessary. For example, if static binary 310 is produced by a compiler without profile information, the .hint and .hint.2.text sections may not be created. In other embodiments, when profile information is not available at compile time, default .hint and .hint.2.text sections are included within the static binary.

Runtime library 320 with h-flow includes essential portion 322 and non-essential portion 324. Essential portion 312 of static binary 310 and essential portion 322 of runtime binary 320 are combined at runtime by loader 340 to create essential portion 332 of runtime binary 330. Likewise, non-essential portion 314 of static binary 310 and non-essential portion 324 of runtime library 320 are combined at runtime by hint loader 350 to create non-essential portion 334.

In some embodiments, runtime libraries do not exist, and runtime binary 330 does not include any information from runtime libraries. In other embodiments, multiple runtime libraries exist and runtime binary 330 includes information from the static binary and the multiple runtime libraries.

At load time, loader 340 combines the essential sections from the different binaries and produces the essential portion of the runtime binary. The text sections are combined such that programs within each can interoperate. The data sections are combined such that the data space for each is available at runtime. Also at load time, hint loader 350 combines the non-essential portions of the different binaries and produces the non-essential portion of the runtime binary. The hint sections can be combined, or one can override the other. For example, the static .hint section can be a default hint section. In some embodiments, the operation of hint loader 350 is hidden from the user.

Runtime binary 330 includes essential portion 332 and non-essential portion 334. Essential portion 332 includes a .text section and a .data section. Essential portion 332 can also include other sections such as a .bss section. Non-essential portion 334 includes a .hint section and a .hint.2.text section. The .hint section includes h-flow code, and the .hint.2.text section includes conjugate mapping information. When the runtime binary with h-flow is executed, the .text section within essential portion 332 runs on a main pipeline that is visible to the instruction set architecture, such as main pipeline 106 (FIG. 1). The .hint.2.text section within non-essential portion 334 is installed in a conjugate mapping table, such as conjugate mapping table 200 (FIG. 1), and the hint section includes h-flow code sequences that run on an h-flow pipeline, such as h-flow pipeline 120 (FIG. 1).

The non-essential code as generated by compiler and linker 304 and profiler and profiled data 306 can perform many different purposes as described above with reference to FIG. 1. For example, the h-flow code can provide architecture specific hints for the target platform. If a particular generation of processor is targeted, then the h-flow code can be generated targeted at that particular processor. Likewise, if a different generation of processor is targeted, then the h-flow code can be designed to generate hints appropriate for that processor.

Architecture specific h-flow code allows for common essential code to be shared across several generations, and even separate architectures, of processors. For example, an essential portion of a static binary can be compiled once, and "optimizations" can be performed with h-flow at runtime.

The essential portion 312 of static binary 310 can be a "perpetual version" of an optimum essential binary assuming a near perfect microarchitecture (e.g. no branch misprediction or cache miss). Non-essential portion 314 of static binary 310 can include microarchitecture specific non-essential code to implement the essential code on a specific microarchitecture. The combination of the "perpetual version" of the essential code and the microarchitectural specific non-essential code together can dynamically approximate the performance of the ideal microarchitecture.

Figure 4:
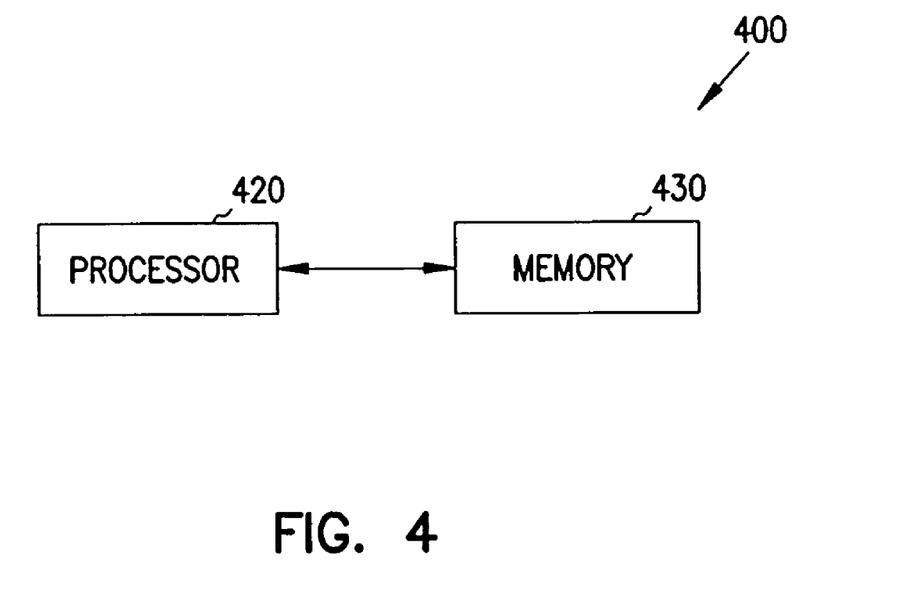
FIG. 4 shows a processing system.

FIG. 4 shows a processing system 400. Processing system 400 includes processor 420 and memory 430. In some embodiments, processor 420 is a conjugate processor such as processor 100 (FIG. 1). In some embodiments, processor 400 is a processor capable of compiling and loading software such as that shown in FIG. 3. Processing system 400 can be a personal computer (PC), server, mainframe, handheld device, portable computer, set-top box, or any other system that includes software.

Memory 430 represents an article that includes a machine readable medium. For example, memory 430 represents any one or more of the following: a hard disk, a floppy disk, random access memory (RAM), read only memory (ROM), flash memory, CDROM, or any other type of article that includes a medium readable by a machine. Memory 430 can store instructions for performing the execution of the various method embodiments of the present invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A processor comprising:
   a first memory configured to store a sequence of instructions representing essential code;
   a second memory configured to store sequences of instructions representing non-essential code;
   a conjugate mapping table configured with a plurality of triggers to specify respectively different sequences of the non-essential code to be executed from the second memory; and
   a single microarchitecture structure configured to execute instructions both from the essential code and from the non-essential code, the processor being coupled to both the first and second memories to process code from the first memory, and to process code from the second memory in response to the triggers,
   wherein the first memory is coupled to a first instruction cache configured to cache instructions that determine the logical correctness of a program,
   wherein the second memory is coupled to a second instruction cache configured to cache instructions that provide hints for the execution of the instructions that determine the logical correctness of the program.

2. The processor of claim 1 wherein the first memory is coupled to registers that store a microarchitectural state, and wherein the conjugate mapping table is responsive to the microarchitectural state.

3. The processor of claim 2 wherein the second instruction cache is coupled between the conjugate mapping table and the second memory.

4. The processor of claim 1 wherein the conjugate mapping table comprises a plurality of records, each of the plurality of records being configured to map a trigger to a non-essential code sequence.

5. The processor of claim 4 wherein the trigger comprises an atomic value, such that the conjugate mapping table is configured to specify the non-essential code sequence when the atomic value is satisfied.

6. The processor of claim 4 wherein the trigger comprises a vector value, such that the conjugate mapping table is configured to specify the non-essential code sequence when the vector value is satisfied.

7. The processor of claim 1 wherein the microarchitectural structure includes a register bank.

8. The processor of claim 1 further comprising a dynamic code analyzer to generate non-essential code from the essential code in the first memory.

9. The processor of claim 1 further comprising a dynamic code analyzer directed acyclic graph trace representations of at least some of the essential code from the first memory.

10. The system of claim 1 where the single microarchitecture structure is configured to execute all instructions from both the essential and the non-essential code.

11. The system of claim 1 where the second memory further contains some code that is not non-essential.

12. A method comprising:
   loading a first stream of instructions containing essential code into a first memory;
   loading a second stream of instructions containing non-essential code into a separate second memory;
   storing a mapping table relating a plurality of triggers to respective ones of a plurality of different sequences of the non-essential code;
   executing instructions from the essential code from the first memory in a microarchitecture structure until detecting an occurrence one of the triggers;

thereafter, executing instructions from one of the non-essential code sequences in the same microarchitecture structure, the one sequence being specified by the one trigger, wherein the non-essential code includes sequences to prefetch essential code into the first memory.

13. The method of claim 12 wherein the first and second memories are a first and second pipelines.

14. The method of claim 12 wherein the first and second memories are caches.

15. The method of claim 14 wherein the first and second memories are logically separate.

16. The method of claim 14 wherein the first and second memories are physically separate.

17. A method comprising:
loading a first stream of instructions containing essential code into a first memory;
loading a second stream of instructions containing non-essential code into a separate second memory;
storing a mapping table relating a plurality of triggers to respective ones of a plurality of different sequences of the non-essential code;
executing instructions from the essential code from the first memory in a microarchitecture structure until detecting an occurrence one of the triggers;
thereafter, executing instructions from one of the non-essential code sequences in the same microarchitecture structure, the one sequence being specified by the one trigger,
wherein the non-essential code includes hint code generated by a compiler from the essential code.

18. The method of claim 17 wherein the non-essential code includes sequences to perform instruction set virtualization.

19. The method of claim 18 wherein the included sequences perform respectively multiple ones of the functions.

20. The method of claim 17 wherein certain of the essential code is stored in the second memory.

21. The method of claim 20 wherein the certain essential code includes sequences for virtualization.

22. The method of claim 21 wherein at least one of the sequences virtualizes individual instructions.

23. The method of claim 21 wherein at least one of the sequences virtualizes blocks of instructions.

24. The method of claim 21 wherein at least one of the sequences virtualizes sets of registers.

25. The method of claim 21 wherein at least one of the sequences virtualizes processor hardware resources.

26. The method of claim 17 where the triggers are instruction attributes.

27. The method of claim 26 where the instructions attributes include opcodes, locations, and/or operands.

28. The method of claim 17 wherein the non-essential code includes sequences to perform interrupt or exception processing.

29. The method of claim 17 wherein the non-essential code includes sequences to perform speculative execution.

30. The method of claim 17 wherein the non-essential code includes sequences to perform security checking or sandboxing.

31. The method of claim 17 wherein the non-essential code includes sequences to test the microarchitecture.

32. The method of claim 17 where the triggers are data attributes.

33. The method of claim 32 wherein the data attributes include values and/or locations.

34. The method of claim 17 where the triggers are state attributes.

35. The method of claim 34 wherein the state attributes include architectural and/or microarchitectural states.

36. The method of claim 17 where the triggers are event attributes.

37. The method of claim 36 wherein the event attributes include interrupts, exceptions, and/or processor state register values.

* * * * *